United States Patent [19]

Husted

[11] Patent Number: 5,718,545
[45] Date of Patent: Feb. 17, 1998

[54] TOOL POSITIONING DEVICE

[76] Inventor: Ernie R. Husted, 869 N. Carew Dr., Placentia, Calif. 92670

[21] Appl. No.: 546,830

[22] Filed: Oct. 23, 1995

[51] Int. Cl.$^6$ ......................................................... B23C 7/00
[52] U.S. Cl. ............................................. 409/201; 409/216
[58] Field of Search ................................... 409/143, 144, 409/201, 211, 216, 230, 199

[56] References Cited

U.S. PATENT DOCUMENTS

| | | | |
|---|---|---|---|
| 3,823,644 | 7/1974 | Mello | 90/17 |
| 3,828,649 | 8/1974 | Lecailtel | 409/201 |
| 4,478,540 | 10/1984 | Sachot | 409/211 |
| 4,709,465 | 12/1987 | Lewis et al. | 29/568 |
| 5,238,340 | 8/1993 | Ochiai et al. | 409/201 |
| 5,385,436 | 1/1995 | Corsi | 409/201 |
| 5,584,621 | 12/1996 | Bertsche et al. | 409/201 |

FOREIGN PATENT DOCUMENTS

| | | | |
|---|---|---|---|
| 241382 | 12/1986 | Germany | 409/230 |
| 254542 | 3/1988 | Germany | 409/201 |
| 171239 | 10/1983 | Japan | 409/216 |
| 120956 | 6/1987 | Japan | 409/230 |
| 222809 | 9/1989 | Japan | 409/211 |
| 774825 | 10/1980 | U.S.S.R. | 409/144 |

*Primary Examiner*—Daniel W. Howell
*Attorney, Agent, or Firm*—Gene Scott —Patent Law & Venture Group

[57] ABSTRACT

A machine having a driven rotating drive block to which is pivotally mounted, a spindle block, both of the blocks being rotatable about a first rotational axis. The spindle block is independently driven to pendulously pivot about the drive block around a second rotational axis. A drive shaft is positioned within the drive block and has a proximal end engaged with a parent machine tool spindle to which the invention is married, and also has a distal end engaged with a drive transfer means. A driven shaft is positioned within the spindle block and has a proximal end engaged with the drive transfer means and a distal end engaged with a cutting tool. The drive and driven shafts are independently rotatable within the drive and spindle blocks respectively, and the drive transfer means transfers rotation from the drive shaft to the driven shaft over the full range of angles to which the spindle might be set.

11 Claims, 3 Drawing Sheets

TOOL POSITIONING DEVICE

FIELD OF THE INVENTION

This invention relates generally to tool positioning devices as in machining and such and more particularly to an improved retrofitable spindle assembly designed to convert a standard three-axis machine tool into a full five-axis machine tool.

DESCRIPTION OF RELATED ART

Automated milling machines, such as the CNC (Computer Numerical Control), have become standard equipment used in the manufacture of metallic and non-metallic materials for cutting, drilling, tapping and reaming parts to specific dimensions. For the most part, these machines are capable of moving along three different axis so that the part can be machined at a variety of locations. Unfortunately, when parts need to be machined at different angles on a three-axis machine, the parts must be remounted on the bed of the machine for each new angle. This procedure is time consuming and therefore costly, and thus undesirable for the more complex and the high volume machining applications. While there are many machines with full five-axis capabilities, such machines are expensive. On the other hand, there are literally hundreds of thousands of machines without five-axis capability. Thus, there is a clear need for a spindle attachment that would effectively convert a standard three-axis milling machine into a full five-axis machine.

Mellow U.S. Pat. No. 3,823,644 discloses a five-axis profiler that has a swivel head assembly attached to a vertical slide. The swivel head assembly includes a support, a first rotary slide mounted upon the support for rotation about a first axis, a second rotary slide mounted upon the second rotary slide for rotation about a second axis which crosses the first axis intermediate the respective rear and front ends of the first and second rotary slides to define an acute angle, and a spindle head fixedly secured to the second rotary slide. The spindle head may be rotatably positioned by rotating the first rotary slide and may be titled by simultaneously rotating the first and second rotary slides in opposite directions. Worm gear arrangements are provided for rotating the rotary slides. Unfortunately, this device has a rather large, bulky construction with many moving parts, thus making it relatively expensive to manufacture and maintain.

Lewis et al. U.S. Pat. No. 4,709,465 discloses a machine system adaptable to a wide range of milling conditions and functions by the provision of a master milling head capable of providing spindle-driving power and up to five-axis movement to a wide range of individual spindle heads each designed for a specific machining function, and each selectively, interchangeably, and automatically matable to the master head. However, while this device is designed to provide full five-axis rotational capabilities, it is primarily designed to allow a working tool to be quickly changed to any other desired tool.

Sachot U.S. Pat. No. 4,478,540 discloses a spindle head that can rotate on a support about an axis which forms, with the working plane, an angle α which advantageously is 35° 15'52". The angle between axis of the spindle itself and the axis of rotation of the head is the complement of angle α. The projection of the axis of rotation of the head on the working plane is slanted in relation to the horizontal projection of the main axis of advance, with a slant that is preferably equal to 45°.

Ochiai et at. U.S. Pat. No. 5,238,340 discloses a saddle swivel head tilting device for a double housing type machine tool. The saddle swivel head is provided at the sides in the tilting direction with hydraulic cylinders to which is connected a hydraulic piping system for giving swivel balancing pressures and back pressures when the swivel head is tilted by a predetermined angle by a tilting driving mechanism. The saddle swivel head is tilted while providing swivel balancing pressures to the hydraulic cylinders, and after tilting the head by the predetermined angle, back pressures are applied to the hydraulic cylinders to compensate for a tilting moment of the saddle swivel head.

Although several of these prior art devices provide five axis capabilities, these devices are generally either entire five-axis machines or tilt/rotary table attachments. As disclosed, none of the prior art devices are designed to be attached to a standard three-axis machine to enable the machine to have full five-axis movement capabilities. The present invention fulfills these needs and provides further related advantages as described in the following summary.

SUMMARY OF THE INVENTION

The present invention is an improved spindle attachment that provides a standard three-axis machine with full five-axis rotational capabilities. The attachment is especially designed to be used in conjunction with an automated milling machine used for cutting, drilling, tapping and reaming parts to specific dimensions in the manufacturing of metallic and non-metallic objects.

The device consists generally of a position drive engaged with a rotational drive block which is rotationally engaged to a spindle block. The position drive has an upper worm gear that drives the drive block in rotation, and thus also the spindle block, to rotate about a first rotational axis. The position drive also has a lower worm gear that drives the spindle block to pendulously pivot about the drive block around a second rotational axis. A drive shaft is positioned within the drive block, and independently rotates within it. One end of the drive shaft is engaged with the position drive while the other end of the shaft is engaged with a drive transfer device. A driven shaft is positioned within the spindle block and independently rotates within it. One end of the driven shaft is engaged with the drive transfer device while the other end of the shaft is engaged with a tool. The drive transfer device transfers rotation from the drive shaft to the driven shaft. Thus, when it is desired to machine a part at a selected angle, the upper worm gear of the position drive rotates the drive and spindle blocks about the first rotational axis to the selected position. The lower worm gear then pivots the spindle block and driven shaft about the second rotational axis to the precise desired angle and the machining process then begins. Thus it is a primary object of the present inventive spindle attachment to easily and efficiently adapt a standard three-axis machine to achieve full five-axis positioning capabilities. This allows parts to be machined at all different angles without having to rotate the part for each different desired angle, thus saving a significant mount of time and money on each machined part. The present invention can be easily attached to a variety of different standard three-axis machines, thus making its use significantly less expensive than purchasing a machine with full five-axis capability.

It is another object of the present invention to provide an attachment that is more compact and efficient than prior art devices. The device has relatively few moving parts, thus reducing maintenance and repair costs. In addition, the present inventive worm gear configuration makes the device extremely precise and with minimal backlash in operation.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention, a device for positioning a machining tool. In such drawings.

DETAILED DESCRIPTION OF THE PREFERRED EMBODIMENT

Figure 2:
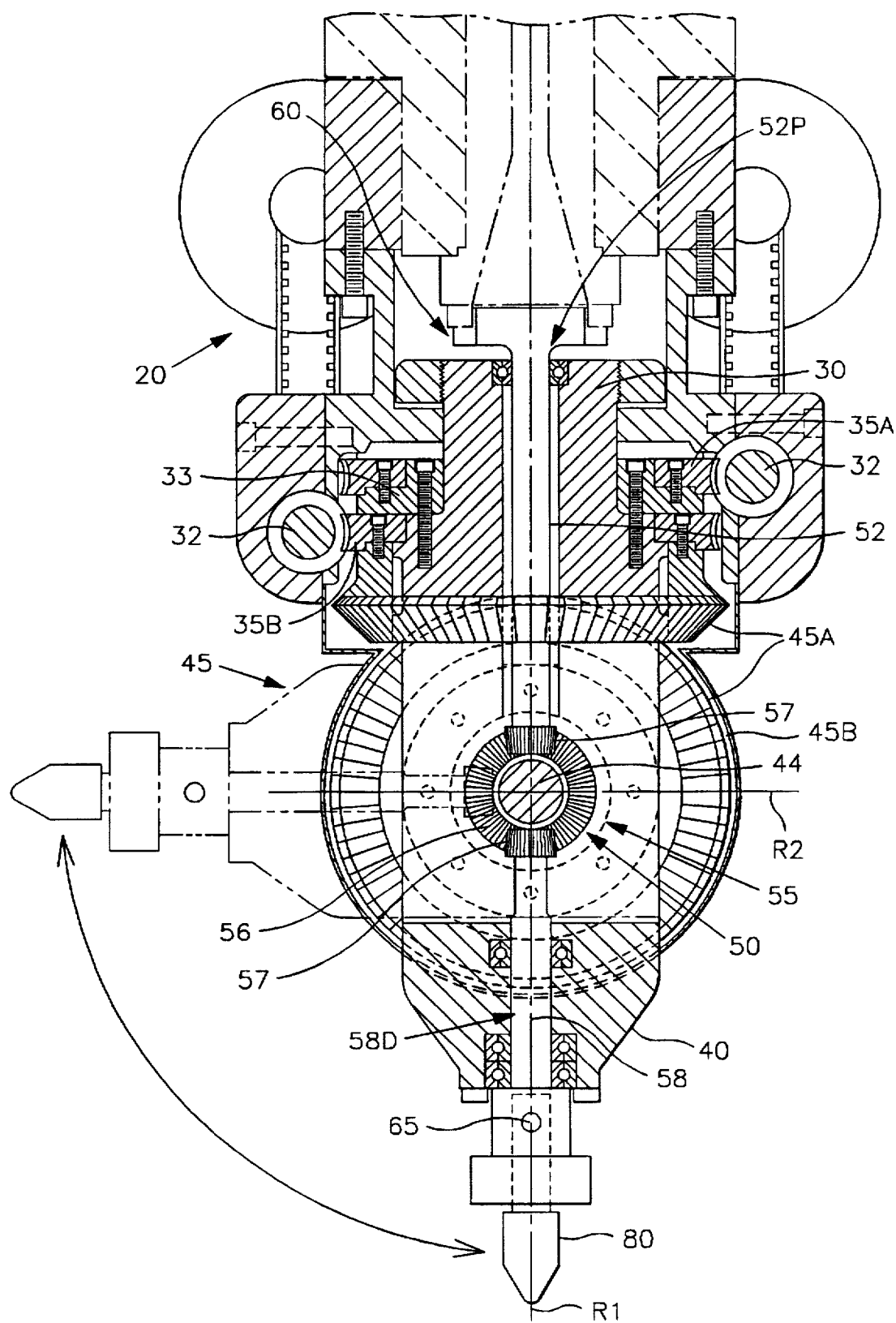
FIG. 2 is a front elevational view shown in cross-section as taken along line 2—2 in FIG. 1.
Figure 3:
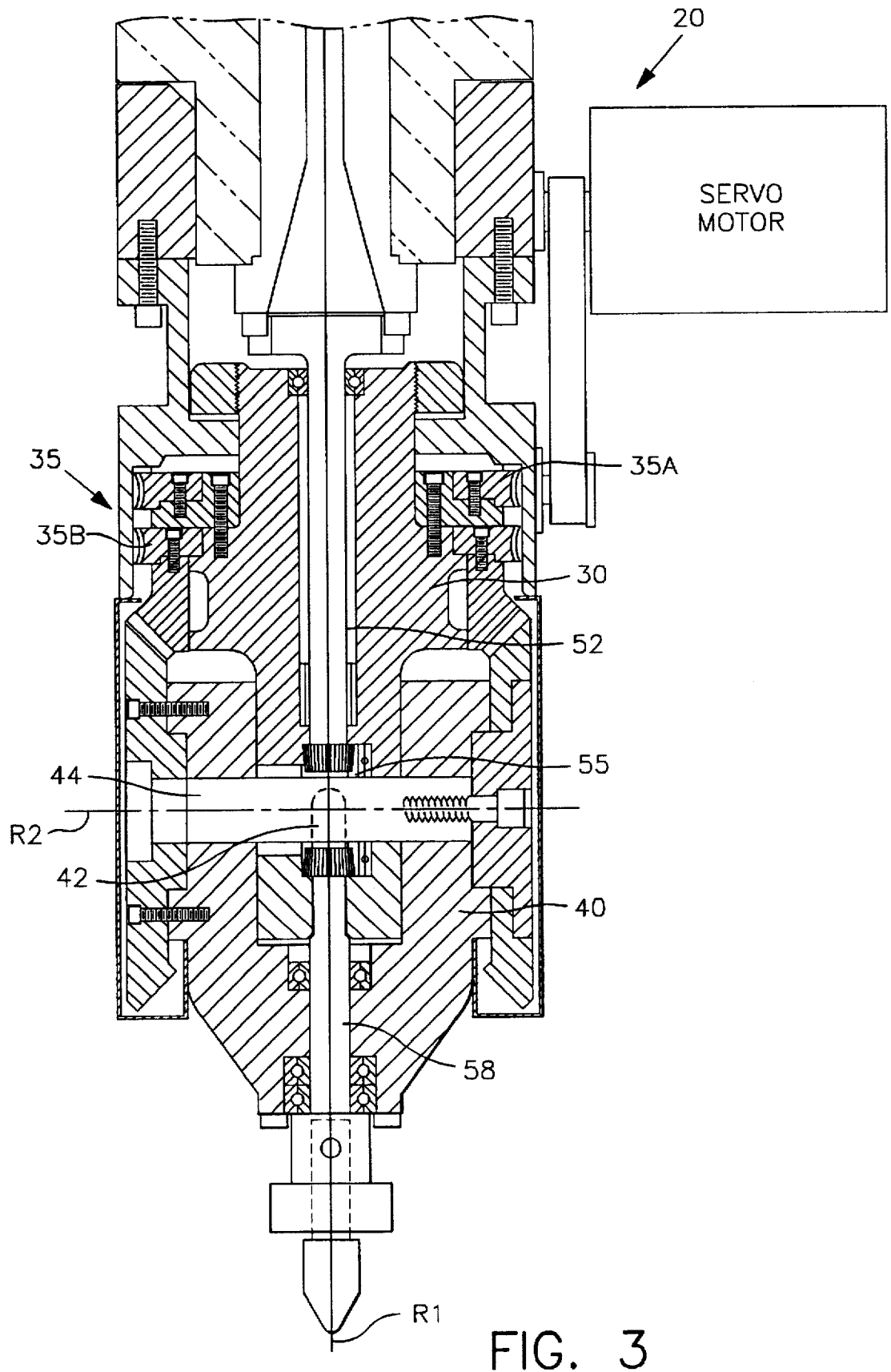
FIG. 3 is a side elevational view shown in cross-section as taken along line 3—3 in FIG. 1.

The above described drawing figures illustrate a machine for positioning a tool in three-space. As shown in FIG. 3 the machine has a position drive means 20 that engages a rotationally mounted drive block 30. The position drive means 20 rotates the drive block 30 about a first rotational axis R1, and the drive block 30 is rotationally engaged with a spindle block 40 by axle 44, so that the spindle block 40 rotates with the drive block 30 around the first rotational axis R1. The drive means 20 also pendulously pivots the spindle block 40 about the drive block 30 around a second rotational axis R2, that of axle 44, which is orthogonal to the first rotational axis R1, as best seen in FIG. 2. Preferably, the spindle block 40 is continuously rotatable about the first rotational axis R1 and is pivotable about the second rotational axis R2 by at least 180 angular degrees.

The position drive means 20 preferably includes a pair of independent drive gears 35, one drive gear 35A engaged with the drive block 30 and the other drive gear 35B engaged with the spindle block 40 for rotation. Preferably, the pair of drive gears 35 are separately driven worm gears, although there are many other drive transfer devices known in the art that may also be implemented. The drive block 30 and the spindle block 40 are also preferably mutually engaged by at least one set of gears 45, the drive block 30 being positionable rotationally by one of the drive gears 35A and the spindle block 40 being positionable pivotally by the other of the drive gears 35B.

There are numerous embodiments of the position drive means 20 well known in the art that may be successfully implemented within the present invention. Preferably, the position drive means 20 consists of one or more servomotors or stepping-motors.

Figure 1:
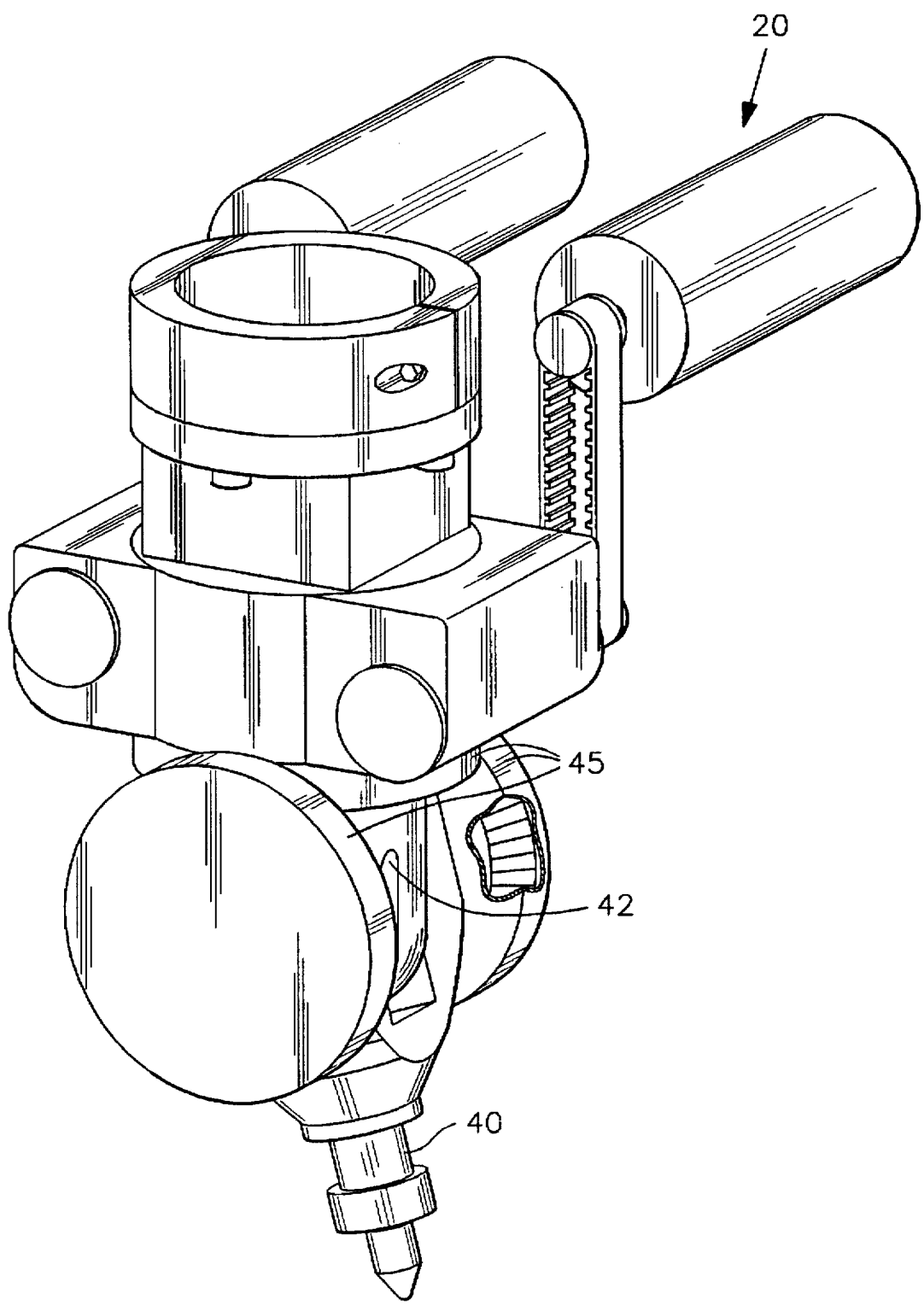
FIG. 1 is a perspective view of the preferred embodiment of the present invention.

A tool drive means 50 is also an integral part of the present inventive machine. The tool drive means 50 includes a drive transfer means 55, a drive shaft 52 that independently rotates within the drive block 30 and a driven shaft 58 that independently rotates within the spindle block 40, the drive shaft 52 thus moving with the spindle block 40 in any pendulously pivotable position. As seen in FIG. 1, the drive block 30 has an elongated slot 42 for accommodating the pivotal motion of the driven shaft 58. The drive shaft 52 provides a rotary drive engagement means 60 at a proximal end 52P, while the driven shaft 58 provides a tool holding means 65 at a distal end 58D for securing a tool 80 to the shaft. The tool holding means 65 may consist of a set screw or any other such fastening device. The drive 52 and driven shafts 58 are engaged with the drive transfer means 55 which effectively transfers rotation from the drive shaft 52 to the driven shaft 58 over an angular range. There are many possible embodiments of the drive transfer means 55 that may be implemented within the scope and spirit of the appended claims. In one preferred embodiment, illustrated best in FIG. 2, the drive transfer means 55 consists of at least one freely rotating gear 56 with which the drive and driven shafts are engaged through independently enmeshed shaft gears 57 that are preferably integrally attached to their respective shafts.

As shown in FIG. 1 the drive means 20 preferably includes independent and separate servo motors 20A, B. These motors are preferably mounted away from the work piece and interconnected with a pair of worms 32 respectively, as best seen in FIG. 2. The worms 32 are each engaged with the worm gears 35A and 35B, so that rotation of the gears 35A, 35B, is precise, independent, and smooth. Please note that gear 35A is mounted onto a retaining ring 33 which is screwed down to the drive block 30. Worm gear 35B is sandwiched between the retaining ring 33 and a pivot drive gear 45A to which it is also mounted so that as gear 35B rotates, so does the pivot drive gear 45A, this motion being wholly independent of the motion of the drive block 30. By directing the motion of each of the worm gears 35 separately it is therefore possible to position the tool 80, first, at any angle around a full 360 degree rotational range, and, secondly, at any angle colinearly aligned with axis R1 to up to more than 90 degrees pivotal range from the R1 colinearly.

The machine is easily interconnected with a machine tool and mounted thereon for adapting such a machine for tool manipulation in three-space, thereby achieving a true 5-axis capability on a machine having only three axis of motion.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A machine for positioning a tool in three-dimensions, the machine comprising:

position drive means engaging a rotationally mounted drive block, the block being rotated about a first rotational axis by the drive means; the drive block rotationally engaging a spindle block so that the spindle block rotates with the drive block, and additionally, driven also by the drive means, pendulously pivots about the drive block around a second rotational axis, the second rotational axis being orthogonal to the first rotational axis;

tool drive means including a drive shaft, a driven shaft and a drive transfer means, the drive and driven shafts engaged with the drive transfer means so that rotation is transferred from the drive shaft to the driven shaft, the drive shaft independently rotating within the drive block, the driven shaft independently rotating within the spindle block, such that with the spindle block in any pendulously pivotable position, the driven shaft moves therewith;

the driven shaft providing, at a distal end thereof, a tool holding means, the drive shaft providing, at a proximal end thereof, a rotary drive engagement means;

the position drive means including a pair of independent drive gears positioned in side-by-side adjacency, both of the drive gears encircling the drive block, one each of the drive gears engaged with the drive block and with the spindle block for rotation thereof respectively.

2. The machine of claim 1 wherein the position drive means includes a pair of independent drive gears, one each of the drive gears engaged with the drive block and with the spindle block for rotation thereof respectively.

3. The machine of claim 2 wherein the drive gears are separately driven worm gears.

4. The machine of claim 2 wherein the drive block and the spindle block are mutually engaged by at least one set of gears, the drive block being positionable rotationally by one of the drive gears, the spindle block being positionable pivotally by the other of the drive gears.

5. The machine of claim 4 wherein the drive gears are separately driven worm gears.

6. The machine of claim 1 wherein the drive transfer means is at least one freely rotating gear, the drive and driven shafts engaged therewith through independently enmeshed shaft gears integral with the shafts respectively.

7. The machine of claim 1 wherein the position drive means is at least one servo-motor.

8. The machine of claim 1 wherein the position drive means is at least one stepping-motor.

9. The machine of claim 1 wherein the spindle block is continuously rotatable about the first rotational axis.

10. The machine of claim 9 wherein the spindle block is pivotable about the second rotational axis by at least 180 angular degrees.

11. A machine for positioning a tool in three-dimensions, the machine comprising:

position drive means engaging a rotationally mounted drive block, the block being rotated about a first rotational axis by the drive means; the drive block rotationally engaging a spindle block so that the spindle block rotates with the drive block, and additionally, driven also by the drive means, the spindle block pendulously pivoting about the drive block around a second rotational axis;

tool drive means interconnected for further pendulously pivoting the spindle block for positioning a tool holding means at any selected radial position within a generally hemispherical space;

the position drive means including a pair of independent drive gears positioned in side-by-side adjacency, both of the drive gears encircling the drive block, one each of the drive gears engaged with the drive block and with the spindle block for rotation thereof respectively.

* * * * *